United States Patent [19]

Kogure et al.

[11] Patent Number: 4,779,250
[45] Date of Patent: Oct. 18, 1988

[54] MAGNETO-OPTICAL SIGNAL READ-OUT SYSTEM USING DIVIDED PHOTODETECTOR

[75] Inventors: Shigeru Kogure; Masatoshi Yonekubo, both of Suwa, Japan

[73] Assignee: Seiko Epson Kabushiki Kaisha, Tokyo, Japan

[21] Appl. No.: 927,216

[22] Filed: Nov. 5, 1986

[30] Foreign Application Priority Data

Nov. 8, 1985 [JP] Japan .................. 60-250127
Jun. 2, 1986 [JP] Japan .................. 61-127805

[51] Int. Cl.$^4$ .............. G11B 7/12; G11B 11/14; G11B 13/04
[52] U.S. Cl. .................. 369/13; 360/114; 365/122
[58] Field of Search ............ 369/13, 120, 110; 360/114, 59; 365/122

[56] References Cited

U.S. PATENT DOCUMENTS

| | | | |
|---|---|---|---|
| 4,525,825 | 6/1985 | Ito et al. ................. | 369/110 |
| 4,569,035 | 2/1986 | Tomita ................... | 365/122 |
| 4,573,149 | 2/1986 | Deguchi et al. ........... | 360/114 |
| 4,631,395 | 12/1986 | Ando ..................... | 369/120 |
| 4,638,470 | 1/1987 | Connell et al. ........... | 369/13 |

FOREIGN PATENT DOCUMENTS 58-77046 5/1983 Japan .................. 369/13
59-79446 5/1984 Japan .................. 360/114

OTHER PUBLICATIONS

Yoshio Aoki et al., A Magneto-Optic. Recording System Using TbFeCo, Sep. 19, 1985, pp. 1624–1628.
I. Sander et al., Digital Magneto-Optical Recorder, Jan. 17, 1983, proceedings SPIE, vol. 382, pp. 240–244.

Primary Examiner—Aristotelis M. Psitos
Assistant Examiner—Hoa T. Nguyen
Attorney, Agent, or Firm—Blum Kaplan

[57] ABSTRACT

A magneto-optical signal read-out system for a magneto-optical player in which the polarized plane of linearly polarized incident light is rotated when the incident light is reflected by or passes through a magneto-optical medium having tracks thereon and the rotation angle of the polarized plane is utilized as an information signal. The read-out system includes a first analyzer, a second analyzer and a photo detector divided into first and second photo detector sections. A differential amplifier receives output signals from the first and second photo detector sections and produces a detected signal representative of the difference between the first and second output signals to reduce in-phase noise in the detected signal.

19 Claims, 8 Drawing Sheets

MAGNETO-OPTICAL SIGNAL READ-OUT SYSTEM USING DIVIDED PHOTODETECTOR

BACKGROUND OF THE INVENTION

The invention is generally directed to a magneto-optical signal read-out system for a magneto-optical player and in particular to a magneto-optical signal read-out system with significantly improved signal to noise ratios resulting from elimination of in-phase noise by use of a differential amplifier based system.

In general there are two distinct types of magneto-optical players: the reflection type, in which the information is read out by utilizing the Kerr rotation angle; and the transmission type utilizing the Faraday rotation angle. An example of the reflection type magneto-optical player is disclosed in the Japanese publication of the Institute of Electrical Engineers in Japan, *Magnetics,* MAG-84-70.

Reference is made to FIG. 1 wherein a conventional optical head of the type used in a reflection type magneto-optical player is shown. The differential read-out system enclosed by a dash line, generally indicated as 120, is described in detail. The light reflected by magneto-optical disk 106 first passes through a half-wave plate 100 and the polarized plane of the light is rotated by 90°. Light is then split into transmitted light and reflected light by a beam splitter 101. The light then passes through analyzers whose analyzing, axes with respect to the polarized plane of the incident light are ±45°. The reflected light is then condensed by lens 102 and focused upon photodiode 103. Similarly, the transmitted light passes through and is condensed by lens 104 and is focused upon photodiode 105.

A differential amplifier takes the difference between the outputs from photodiodes 103 and 105 to detect the signal. By use of this differential detection method, in-phase noise such as laser noise is eliminated. Accordingly, the signal to noise ratio (S/N) of the reproduced signal is improved. As a result, the differential detection method is generally used in optical heads for magneto-optical recording.

An example of a transmission type magneto-optical player is described in detail in publication entitled PROCEEDINGS OF SPIE, Volume 382, pp. 240–244 (1983). The structure of transmission type optical head is shown in FIG. 2. In FIG. 2, the light transmitted through the magneto-optical disk 107 passes through the analyzer 108 to a 4-divided photodiode 109 (the terminology n-divided photodiode will be used in this application to describe a photodiode which is divided into n-parts (where "n" is an integer greater than 1) as a shorthand reference term). This 4-divided photodiode 109 consists of 4 similar photodiodes coupled in parallel. The photodiodes effect the focusing and tracking and permit the RF signal (magneto-optical signal) to be obtained at the same time. In this example, the differential detection method to eliminate in-phase noise as described above is not utilized. For purposes of focusing and tracking, the light source side and the photodetector sides of the optical head are driven together as one body in this example.

A transmission type optical head recently developed by the applicants and now the subject of pending application No. 06/925,202, filed Oct. 31, 1986, is shown in FIG. 3. The principle of the system of FIG. 3 is that the tracking and focusing are performed using the reflected light and the RF signal is detected using the transmitted light. In FIG. 3, the tracking and focusing with respect to magneto-optical disk 110 are controlled by the two dimensional actuator 116 of the objective lens, beam splitter 111, knife-edge 112 and the 4-divided photodiode 113. The RF signal is detected by the analyzer 114 and the photodiode 115.

The magneto-optical system of FIG. 3 is an improvement over the system depicted in FIG. 2 because track accessing is performed in two stages. The tracking system includes a coarse accessing adjustment and a fine accessing adjustment which improves the tracking accuracy and shortens the access time.

In reflection type optical heads, as shown in FIG. 1, the optical signal is generally detected by the differential detection method. Thus, a half-wave plate, a polarizing beam splitter, two lenses and two photodiodes are necessary to implement the optical head. This results in an optical head which inevitably is large, heavy and expensive, all of which are disadvantageous.

Transmission type optical heads have failed to utilize a differential detection method for optical signal detection. The transmission type optical heads are arranged so that structures are located both above and below the magneto-optical disk which causes the head to be large and heavy. If a differential detection arrangement, as is shown in broken line 120 in FIG. 1, is provided at the light transmission side of the optical head, the head becomes much larger, heavier, slower and more expensive, all of which characteristics are undesirable.

A large optical head provides a limit on the miniaturization of the magneto-optical player which is an ongoing design goal. A heavy optical head decreases speed of movement and prevents high-speed access increasingly required in new applications of magneto-optical storage media.

Accordingly, there is a need for an improved magneto-optical head with improved performance utilizing a differential detection method, which is small, lightweight and inexpensive.

SUMMARY OF THE INVENTION

The invention is generally directed to a magneto-optical signal read-out system for a magneto-optical player of a magneto-optical recording medium in which the polarized plane of linearly polarized incident light is rotated when the incident light is reflected by or passes through the magneto-optical recording medium and the rotation angle of the polarized plane is utilized as an information signal. A first analyzer assembly is located so as to intercept a first portion of the incident light and output a first analyzed incident light. The angle between the analyzing axis of the first analyzer assembly and the polarized plane of the linearly polarized incident light is $\phi A$. The second analyzer assembly is located so as to intercept the second portion of the incident light and output a second analyzed incident light. The angle between the analyzing axis of the second analyzer assembly and the polarized plane of the linearly polarized incident light is $\phi B$. A photodetector is divided into first and second photodetector section assemblies by dividing line substantially perpendicular to the track of the recording medium. The first photodetector section assembly is located to intercept the first analyzed incident light and output a first output signal representative of the first analyzed incident light. The second photodetector section assembly is located to intercept the second analyzed incident light and output a second output signal representative of the second analyzed incident light. A differential amplifier receives the first and second output signals and outputs a detected signal which is representative of the difference between the first and second output signals. As a result, the in-phase noise in the detected signal is substantially reduced.

The invention is also directed to a magneto-optical signal read-out system for a magneto-optical player of a magneto-optical recording medium in which the polarized plane of linearly polarized incident light is rotated when the incident light is reflected by or passes through the magneto-optical recording medium and the rotation angle of the polarized plane is utilized as an information signal. The read-out system includes a photodetector for detecting the rotation angle of the polarized plane of the incident light which is divided into 2n photodetector sections by n straight dividing lines in a plane. The 2n-divided photodetector sections are referred to, starting from an arbitrary section and continuing in a counter-clockwise direction, as photodetector sections a1, a2, a3..., a2n where n is a positive integer. One of the 2n straight dividing lines is along direction essentially perpendicular to a track on the recording medium. A first group of analyzers are provided directedly in front of photodetectors a1, a3, a5, . . . , a2n-1 so that the angle between the analyzing axes of the analyzers and the polarized plane of the linearly polarized incident light is $\phi A$. A second group of analyzers are provided directly in front of photodetectors a2, a4, a6, . . . a2n, so that the angle between the analyzing axes of the second group of analyzers and the polarized plane of the linearly polarized incident light is $\phi B$. Angle $\phi A$ and angle $\phi B$ are unequal. A differential amplifier receives the sum of the outputs from photodetectors a1, a3, a5,..., a2n-1 and the sum of the outputs from photodetectors a2, a4, a6..., a2n and outputs the difference in these two sums as an output signal.

Accordingly, it is an object of the invention to provide an improved magneto-optical signal read-out system.

Another object of the invention is to provide an improved magneto-optical signal read-out system utilizing a differential detection method.

A further object of the invention is to provide a magneto-optical signal read-out system which removes in-phase noise such as laser noise by utilizing a differential detection method to increase the signal to noise ratio of the detected signal.

Yet another object of the invention is to provide an improved magneto-optical signal read-out system which reduces the size, weight and cost of a magneto-optical head while maximizing the signal to noise ratio.

Yet another object of the invention is to provide an improved magneto-optical signal read-out system which minimizes the effects of the defects in the recording medium and roughness on the substrate surface on the detection of the signal, thereby reducing the criticality of the storage medium specifications and allowing for a reduction in the cost of the magneto-optical recording medium.

Still another object of the invention is to provide a magneto-optical signal read-out system which obviates the need for half-wave plates, beam splitters, lenses and separate photodetectors required by prior art differential detection method systems.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 4:
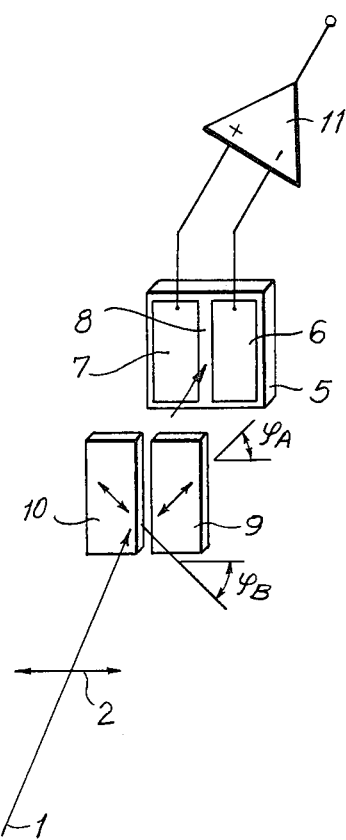
FIG. 4 is a functional diagram of a magneto-optical signal read-out system in accordance with the invention.

Reference is made to FIG. 4 wherein a simplified conceptual diagram of a magneto-optical signal read-out system constructed in accordance with the invention is depicted. Laser light 1, reflected or passing through a magneto-optical recording medium (depending on whether the read-out system is a reflection type or transmission type optical head) enters the system. The direction of the polarized plane of linearly polarized incident light into the magneto-optical recording medium is shown by arrows 2. The linearly polarized incident light 1 enters analyzers 9 and 10. Analyzers 9 and 10 are at angles $\phi A$ and $\phi B$ to the direction of polarized plane 2. Angles $\phi A$ and $\phi B$ are different. In the example of FIG. 4, angle $\phi A$ is a positive angle whereas angle $\phi B$ is a negative angle. The light passing through analyzers 9 and 10 contacts a 2-divide photodetector 5. 2-divided photodetector 5 has a right photodetector 6 and a left photodetector 7 divided by a dividing line 8. Photodetector 6 is placed so as to be directly in line with analyzer 9 and photodetector 7 is directly in line with analyzer 10. Light passing through analyzer 9 will only contact photodetector 6, and light passing through analyzer 10 will only contact photodetector 7.

By taking the difference between the output of photodetector 6 and the output of photodetector 7 with a differential amplifier 11, only in-phase noise such as laser noise is eliminated. The in-phase noise is not polarized and essentially equal amounts of light will pass through analyzers 9 and 10. These equal components will be cancelled out by differential amplifier 11. The in-phase such as light intensity variation is also reduced by differential amplifier 11.

Thus, the structure shown in FIG. 4 has data detection performance which is significantly improved when compared to the level of performance achieved by conventional differential detection systems having additional components. Thus, a read-out signal with a very high signal to noise ratio is output from differential amplifier 11. Moreover, the read-out system of FIG. 4 eliminates the half-wave plate, beam splitter, two lenses and two separate photodetectors that are used in a conventional differential detection system. Accordingly, the size and weight of the head and device are greatly reduced and the cost of the device is significantly reduced as well without a sacrifice in performance.

Figure 5:
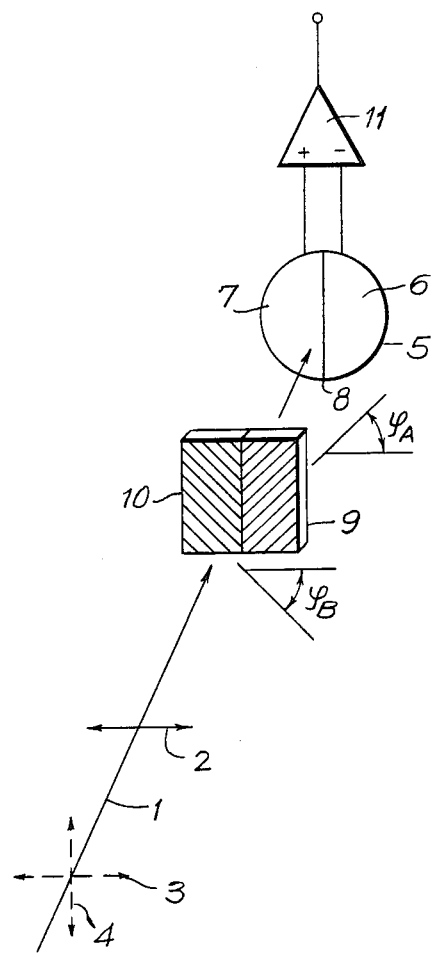
FIG. 5 is a second schematic functional diagram of a magneto-optical signal read-out system constructed in accordance with the invention.

Reference is next made to FIG. 5 wherein a second conceptual drawing of a magneto-optical signal read-out system of the invention is depicted, like reference numerals representing like elements. Laser beam 1, shown in FIG. 5, has already been reflected by or transmitted through a magneto-optical recording medium. Polarized plane 2 is the initial polarized plane of the laser beam 1 prior to reflection by or transmission through the magneto-optical recording medium. Arrows 3 and 4 are representative of the directions tangential to the track on the recording medium and the direction perpendicular to the tangential direction (also referred to as the radial direction). The rotation angle of the polarized plane caused by the magneto-optical recording medium is very small (less than 1°) and the polarized plane 2 therefore almost coincides with the polarized plane of the linearly polarized incident light into the medium.

Figure 6:
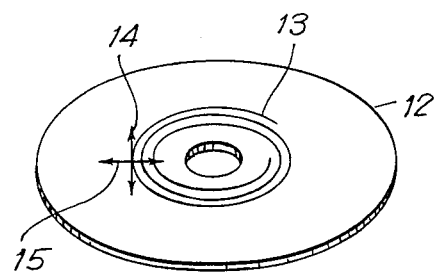
FIG. 6 is a perspective view of a disk utilized in connection with a magneto-optical signal read-out system.

Reference is made to FIG. 6 wherein an optical disk 12 is shown for purposes of describing the tangential and perpendicular or radial directions. For purposes of explanation, optical disk 12 is shown with a guide groove or recorded series of pits 13. The groove can be spiral, a series of concentric circles or other arrangements. Arrow 14 is the direction tangential to the track while arrow 15 represents the direction in the plane of disk 12 perpendicular to tangential direction 14. If the recording medium is an optical card or the like, rather than an optical disk, the track consists of straight lines rather than curved lines. However, the same principle is applied with regard to tangential and perpendicular directions.

With this in mind, reference is again made to FIG. 5 wherein analyzers 9 and 10 are shown with the analyzing axes represented by the series of parallel lines. The angles $\phi A$ and $\phi B$ of analyzers 9 and 10 are taken with respect to polarized plane 2. 2-divided photdetector 5 is shown in FIG. 5 as a circular member as contrasted with that shown in FIG. 4. There is no conceptual difference between the rectangular photodetectors 6 and 7 of FIG. 4 and the semi-circular photodetectors 6 and 7 of FIG. 5. In practice the laser light is shaped into a circular beam so that either photodetector will capture the significant light. A straight line 8 oriented vertically (FIG. 4) forms the dividing line between photodetectors 6 and 7. The reason for the orientation of dividing line 8 is described by example with reference to an optical disk.

Magneto-optical disks are becoming an extremely popular recording medium due to the vast amounts of information which can be stored on them. A standard magneto-optical disk has a guide groove with a track pitch of 1.6 microns, a groove width of 0.8 microns, and a groove depth of 700 angstroms. As a result, extreme accuracy of tracking is required. Tracking is generally performed by a push-pull method in which the reflected light which is defracted by the guide groove is utilized to control tracking. Other tracking methods such as the three beams method are also utilized. However, whichever method is used, tracking fluctuation and tracking accuracy problems arise, particularly in view of the required level of accuracy due to the microscopic dimensions of the guide groove.

Figures 7A, 7B, 7C:
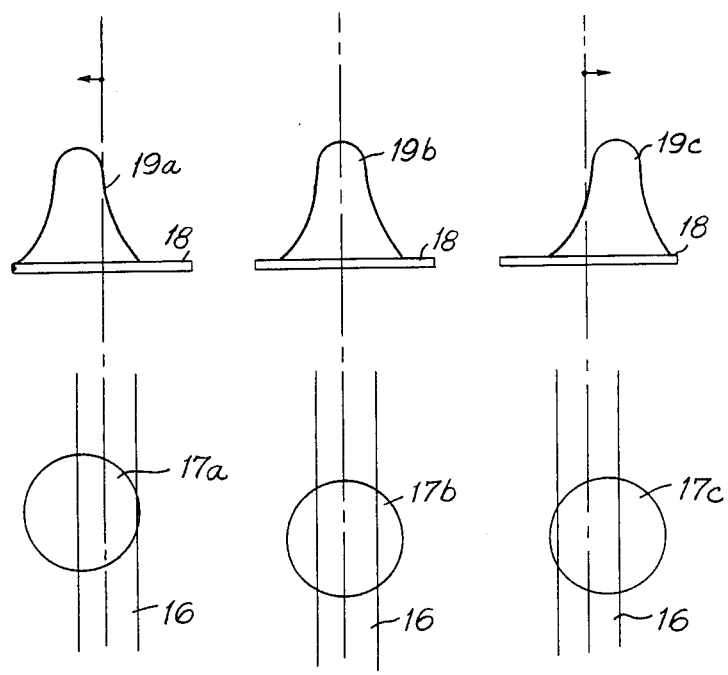
FIGS. 7A, 7B and 7C are diagrammatic illustrations of the light intensity distribution on a photodetector when the laser spot is moved relative to the center of the guide groove.

In order to prevent the tracking accuracy problem from affecting the detection of the RF signal (magneto-optical signal), the present invention defines the straight dividing line 8 of the photodetector along perpendicular direction 4. Reference is made to FIGS. 7A, 7B and 7C for a more detailed explanation of the reason for providing dividing line 8 along the direction perpendicular to the track direction. In FIGS. 7A, 7B and 7C, reference numeral 16 is the guide groove on the optical disk and reference numerals 17a, 17b and 17c are the spots of laser light focused onto optical disk. The upper portions of FIGS. 7A, 7B and 7C show photodetector 18 and the light intensity distributions 19a, 19b and 19c on the photodetector corresponding to the relative positioning of the laser spot 17a, 17b and 17c relative to guide groove 16.

When the laser spot is at the center of guide groove 16 and shown in FIG. 7B, the light density peak is present at the position on the photodetector corresponding to the center of the guide groove. When the laser spot moves to the right or left of the center of the guide groove as shown in FIGS. 7C and 7A, respectively, the peaks of the light intensity on the photodetector move to the right and left, respectively.

As a result, if the photodetector is divided by a line along a direction tangential to the track (vertical direction in FIGS. 7A, 7B and 7C), the amount of light contacting each of the photodetectors (without the analyzers being present) is different. Thus, the tracking fluctuation will have a significant effect on the detected differential signal. In contrast, if the photodetector is divided by a line along the direction perpendicular to the track (perpendicular to groove 16), the effect of the tracking fluctuation is avoided. This is seen by drawing a dividing line perpendicular to the groove at the center of the laser spot.

As a result, the detected signal will be of as high a quality as the signal detected by the conventional differential detection method in which the light is split by a beam splitter and the difference between the output signals from the split light beams is taken. By orienting dividing line 8 along the direction perpendicular to the guide track a detected signal with a significantly improved S/N ratio is achieved.

EMBODIMENT 1

Figure 8:
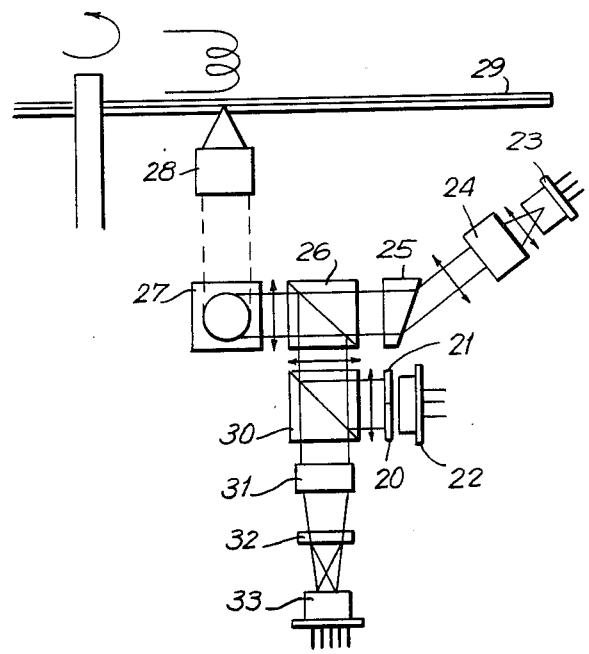
FIG. 8 is a schematic diagram of the optical path of a reflection type optical head used in a magneto-optical signal read-out system constructed in accordance with a preferred embodiment of the invention.

Reference is made to FIG. 8 wherein a reflection type optical head including a magneto-optical signal read-out system constructed in accordance with a first embodiment of the invention is depicted.

The light output from a laser diode 23 is adjusted to parallel light by collimator lens 24 and then shaped by a beam shaping prism 25 so that the cross section of the parallel light is a circle. Next, the light passes through a beam splitter 26, is reflected upward in a direction perpendicular to the direction of the light output from beam splitter 26 and is focused onto a magneto-optical disk 29 by an objective lens 28. The light reflected by magneto-optical disk 29 follows the same course in reverse through objective lens 28 and mirror 27 before being reflected downward by beam splitter 26. The reflected light then enters beam splitter 30 which allows some of the light to be transmitted downward and the remaining portion to be reflected to the right (FIG. 8).

The light transmitted downward through beam splitter 30, which is used for tracking and focusing, passes through a lens 31 and a cylindrical lens 32 before entering a 4-divided photodiode 33. The tracking and focusing are performed by the push-pull method and the astigmatism method, respectively.

The light reflected by beam splitter 30 passes through Polaroid sheet films 20 and 21. The lower portion (in FIG. 8) of the reflected light passes through Polaroid sheet film 20 while the upper half of the light reflected by beam splitter 30 passes through Polaroid sheet film 21. The transmitted light is detected by the 2-divided PIN photodiode 22. In this embodiment the analyzers are polarized films. "Polaroid sheet film" is a trade name for a well-known polarized film. Polaroid sheet films 20 and 21 are formed so that the angles of the analyzing axes of the film with respect to the polarized plane of the incident light is +45° and −45°, respectively. As a general matter, the angles $\phi A$ and $\phi B$ are defined in the range of $0 < |\phi A|$ and $|\phi B| \leq 45°$. When angles $\phi A$ and $\phi B$ are defined as +45° and −45°, the tolerances for setting the angles are not severe which is advantageous. The double headed arrows in FIG. 8 at various points indicate the direction of the polarized plane of the linearly polarized light. The small rotation angle of the polarized plane of light caused by the magneto-optical recording medium is small enough not to be considered. From the drawing it is clear that the polarized plane of light contacting the magneto-optical disk 29 is along the direction tangential to the track of disk 29. Accordingly, the straight dividing line on the 2-divided PIN photodiode 22 is in a direction vertical to the surface of the paper.

Embodiment 1 divides the photodiode into two portions. In a generalized approach wherein the photodiode is divided into 2n sections, Embodiment 1 is a n=1 embodiment.

Figure 9:
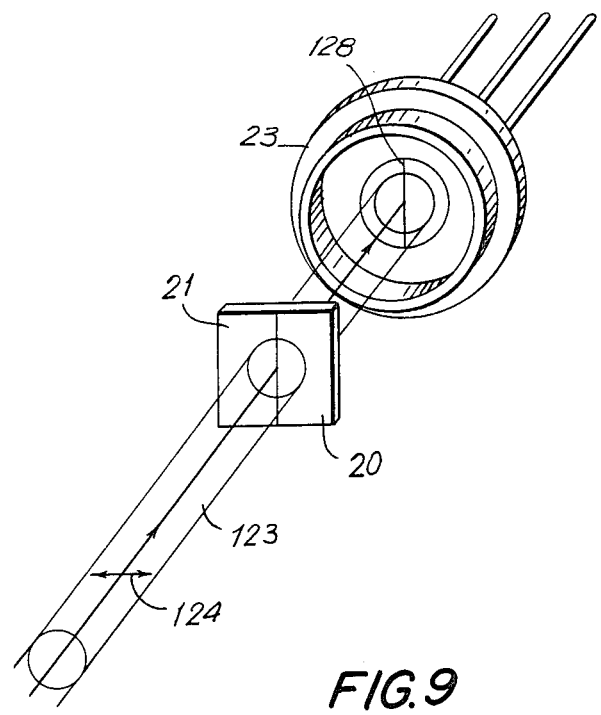
FIG. 9 is a diagram illustrating the relationship between the direction tangential to the track and the straight dividing line of the divided photodetector.

Reference is made to FIG. 9 wherein the relationship between the direction of the polarized plane of the incident light 124, which is also the direction tangential to the track on the optical disk, and the dividing line 128 in diode 23 is shown. Laser light beam 123 having a circular cross section first contacts Polaroid sheets 20 and 21 prior to contacting 2-divided PIN photodiode 23. As is clearly seen in FIG. 9, the dividing line 128 is perpendicular to the direction tangential to the track on the optical disk. This perpendicular direction, along which dividing line 128 is oriented may also be identified as parallel to the radial direction when the disk is circular. That is, the direction of a radius starting at the tangent point of the track to the center of the disk. When the optical head and objective lens are not driven together, a tracking offset is caused by the lens shift. However, the harmful effect of this tracking offset is prevented by dividing the photodetector as shown in FIG. 9.

The read-out system of FIG. 8 produces a detected signal with a signal to noise ratio as high as that obtained by the conventional differential detection methods. However, there is no need to provide a half-wave plate, a polarizing beam splitter, two lenses and two separate photodetectors as conventionally required. Accordingly, there is a great reduction in the size, weight and cost of the magneto-optical head.

EMBODIMENT 2

Figure 1:
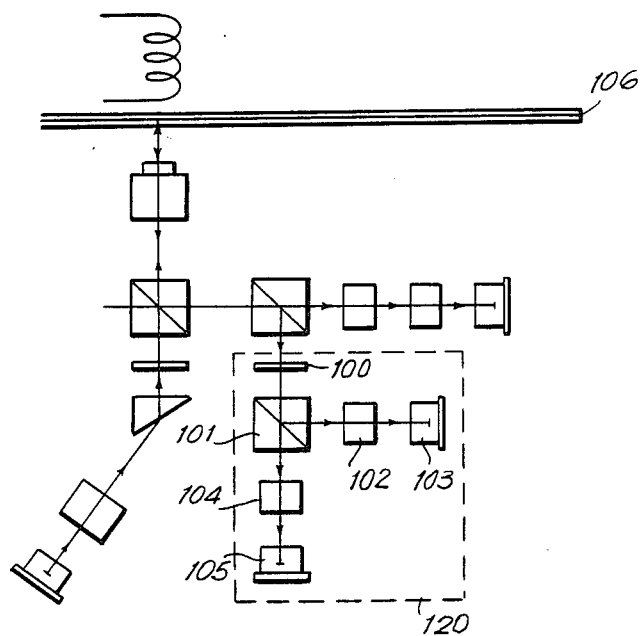
FIG. 1 is a schematic diagram of the structure of reflection type optical head constructed in accordance with the prior art.
Figure 2:
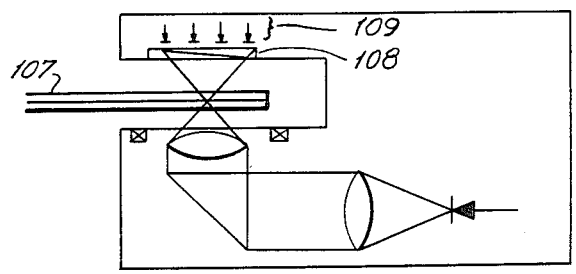
FIG. 2 is a schematic diagram showing the structure of a transmission type optical head constructed in accordance with the prior art.
Figure 3:
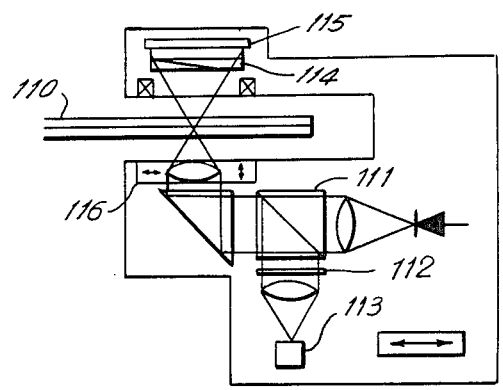
FIG. 3 is a schematic diagram showing another example of a transmission type optical head as disclosed in applicants' co-pending U.S. patent application Ser. No. 06/925,202, filed Oct. 31, 1986.
Figure 10:
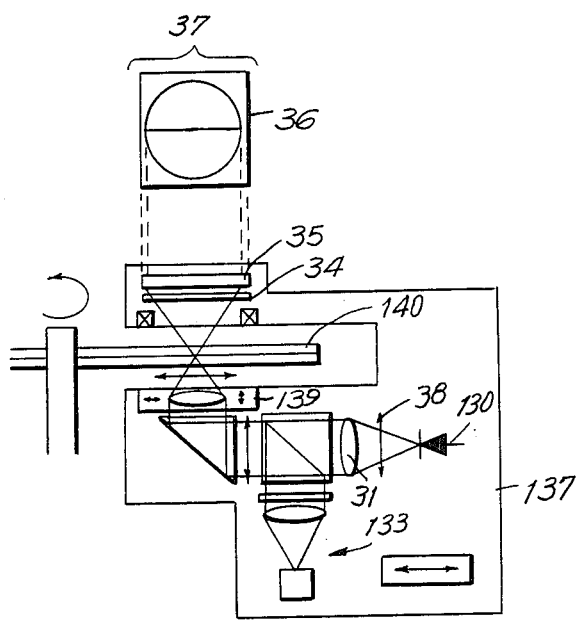
FIG. 10 is a schematic view illustrating the optical path of a transmission type optical head for use in a magneto-optical signal read-out system constructed in accordance with a second preferred embodiment of the invention illustrating the optical path where n=1.

Reference is next made to FIG. 10 wherein an embodimen of a transmission type optical head 137 of the type developed by the applicants with a magneto-optical signal read-out system (of order n=1), constructed in accordance with the invention is depicted. In the embodiment of FIG. 10, the 2-divided PIN diode 35 is located on the opposite side of optical disk 140 from light source 130, lens 131 and tracking and focusing mechanisms 133 and 139 as shown in FIG. 3. However, like Embodiment 1, the straight dividing line of the photodetector is along a direction perpendicular to the direction of the track.

The tracking and focusing are performed by the push-pull and knife-edge methods, respectively. In the optical head structure of Embodiment 2 shown in FIG. 10, even when the laser spot is perfectly centered in the guide groove, laser light transmittted through medium is not at the center of the 2-divided PIN photodiode 35 due to the lens shift. However, by defining dividing line 36 in 2-divided PIN photodiode 35 along the direction perpendicular to the track, the problems resulting from the lens shift are prevented. Reference numeral 37 shows photodiode 35 in a plane view to highlight the direction of dividing line 36. Polarizing plane 38 of the light is shown by the large two-headed arrows.

In this embodiment, the magneto-optical signal readout system does not significantly change the size, weight and cost of the optical head. However, the signal to noise ratio of the signal obtained is greatly increased for significantly improved performance. The knife-edge, lenses and 2-divided photodiode are in fact provided parallel to the surface of the disk which makes the actual optical head thinner than is shown in FIG. 10.

EMBODIMENT 3

Embodiments 1 and 2 described above are first order or n=1 type devices where the photodetector is divided into two sections. In devices where n=1 defects such as dust and scratches on the magneto-optical recording medium may effect signal detection and increase the likelihood of read-out error.

The cause of the problem that arises when dust or a defect is present is discussed with reference to FIG. 5. As viewed from 2-divided photodetector 5, the track on the disk run from right to left. If there is a defect on the track the reflected light defracted by the defect on the track enters analyzer 9 and then photodetector 6. Likewise light enters analyzer 10 and then photodetector 7. As a result, the effect of the track defect will effect the resultant signal detected as the difference between the outputs of the two detectors depending upon where along the track the defect is present. As a result, only when the straight dividing line 8 of the photodetector is exactly centered on the defect will there be no effect on the signal detection due to the track defect. Thus, in order to minimize read-out resulting from dust or defects "n" is increased to two which corresponds to a photodetector divided into four parts.

Figure 11:
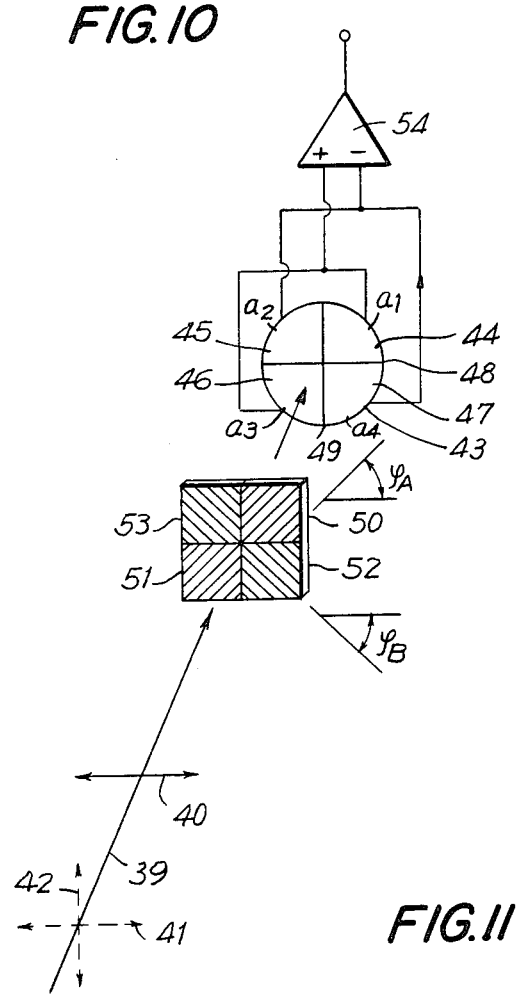
FIG. 11 is a schematic view, of a magneto-optical signal read-out system constructed in accordance with a third preferred embodiment of the invention where n=2.

Embodiment 3 where n=2 is shown in FIG. 11. 4-divided photodetector 43 is divided into four sections by straight dividing lines 48 and 49 where dividing line 49 is perpendicular to the track direction and dividing line 48 is parallel to the tangential track direction. Dividing lines 48 and 49 divide 4-divided photodetector 43 into photodetector sections 44, 45, 46 and 47 which are also identified as photodetectors a1, a2, a3 and a4, respectively. Four analyzers 50, 51, 52 and 53 are placed in the optical path in front of photodetector sections 44, 46, 47 and 45, respectively. Analyzers 50 and 51 are provide in front of photodetectors a1 and a3, respectively, so that the angle of their analyzing axes with respect to the polarized plane of the incident light is $\phi A$. Analyzers 53 and 52 are located directly in front of photodetectors a2 and a4, respectively, so that the angle of the analyzing axes to the polarized plane of incident light is $\phi B$.

Differential amplifier 54 takes the difference between the sum of the outputs from photodetectors a1 and a3 and the sum of the outputs from photodetectors a2 and a4 to produce the output signal. The outputs of photodetectors a1, a2, a3 and a4 are A1, A2, A3 and A4, respectively. The output "I" of differential amplifier 54 is expressed by the following equations:

$$I = (A1 + A3) - (A2 + A4) \quad (1)$$
$$= (A1 - A2) + (A3 - A4) \quad (2)$$
$$= (A1 - A4) + (A3 - A2) \quad (3)$$

The first and second terms of the right-hand side of equations (2) are the differences between the outputs from the photodetectors divided by straight dividing line 49. As a result, the detected signal is not affected by problems with tracking accuracy (tracking fluctuation).

Figures 12A, 12B, 12C:
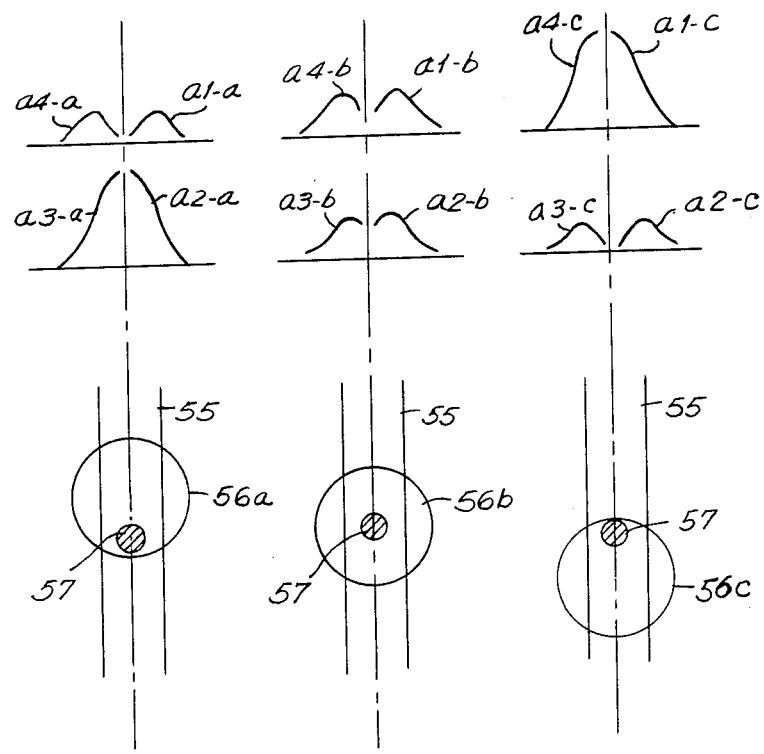
FIGS. 12A, 12B and 12C show the light intensity distribution on a 4-divided photodetector when there is a defect in the medium in the lower portion, center and upper portion of the laser spot, respectively.

Reference is next made to FIGS. 12A, 12B and 12C for an explanation of the significance of dividing the photodetector by a straight line along the direction tangential to the track (line 48) and the effect a defect in the track has on signal detection.

A guide groove 55 is shown in FIGS. 12A, 12B and 12C with laser spots 56a, 56b and 56c focused on the recording medium with a defect 57 in various parts of guide groove 55. The light intensity distributions on photodetectors a1, a2 a3 and a4 are represented by a1 - a, a2 - a, a3 - a and a4 - a, respectively.

The output of the differential amplifier, for the light intensity distributions of FIGS. 12A, 12B and 12C, is the value which is the difference between the outputs from photodetectors a1 and a4 plus the value which is the difference between the output from photodetectors a2 and a3. The difference in these values is very small. Therefore, the effect of the track defect on the output I of the differential amplifier is small. In the read-out system constructed in accordance with Embodiment 3, the above described calculation is performed as shown by formula (3) above and the effect of the track defect on signal detection is very small.

Applying the magneto-optical signal detection system of Embodiment 3 to the reflection type optical head and the transmission type optical head described above with Embodiments 1 and 2, the size, weight and cost of the optical head is significantly reduced and a high S/N ratio is achieved which was previously only obtainable by the differential detection method with the numerous additional components. Significantly, this embodiment also minimizes the effect of a defect on the recording medium on signal detection thereby decreasing read-out error. The reduction in read-out error by the magneto-optical signal read-out system constructed according to the present embodiment also has the benefit of decreasing the stringency of required parameters of the recording medium and substrate with respect to defects. Thus, the cost of the recording medium, with relaxed quality control, can also be lowered.

EMBODIMENT 4

The read-out systems of Embodiments 1, 2 and 3 utilize structures in which n=1 or n=2. The small surface roughness of the substrate of a recording medium can sometimes reduce the signal to noise ratio of the detected signal with these embodiments to be slightly lower than that of the signal obtained by the conventional differential detection method with the additional components. A glass substrate in which the guide groove is directly produced by a dry etching process has very little fine surface roughness (hereinafter referred to as "substrate noise") to effect the signal to noise ratio. However, in an inexpensive pregrooved plastic substrate formed by an injection molding technique, the substrate noise is slightly larger and potentially troublesome. In order to substantially eliminate the effect of the substrate noise, an n=4 system where the photodetector is divided into eight sections as is shown in FIG. 13 is utilized.

Figure 13:
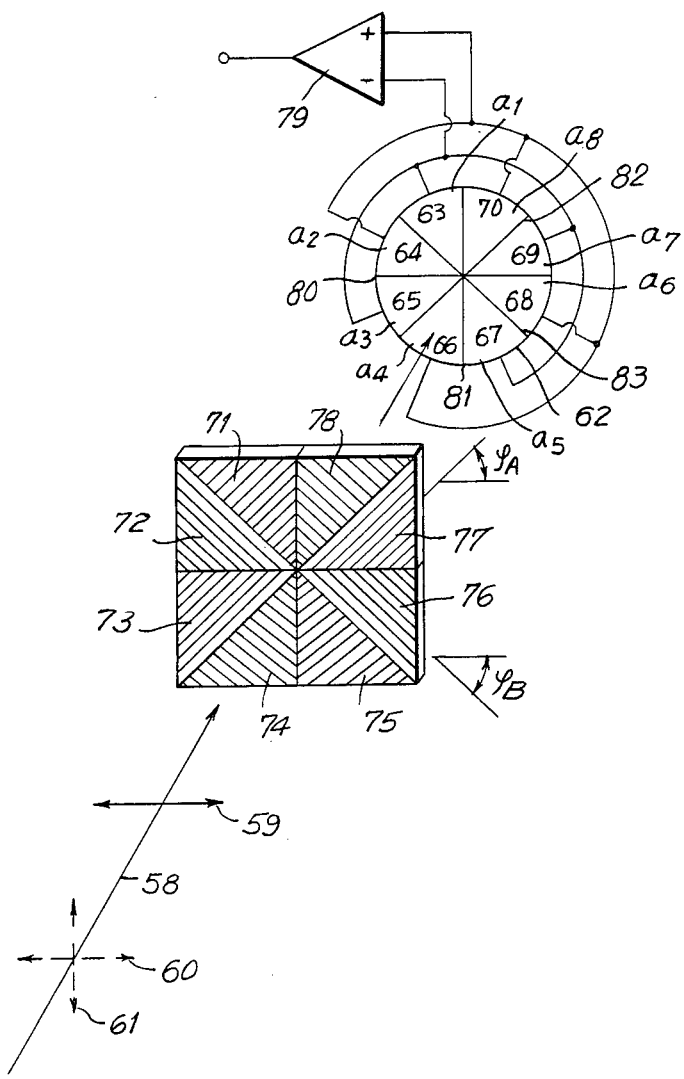
FIG. 13 is a schematic view showing a magneto-optical signal read-out system constructed in accordance with a fourth preferred embodiment of the invention wherein n=4.

FIG. 13 has a beam of laser light 58 with a polarized plane aimed at an 8-divided photodetector 62. 8-divided photodetector 62 is divided by straight dividing lines 80, 81, 82 and 83 of which dividing lines 80 and 81 are along the directions tangential and perpendicular to the track. Lines 82 and 83 are shown as dividing 8-divided photodetector 62 into eight equal pie shaped sections although such an arrangement is not essential. Dividing lines 80, 81, 82 and 83 create photodetector section 63, 64, 65, 66, 67, 68, 69 and 70 which are photodetectors a1, a2, a3, a4, a5, a6, a7 and a8, respectively. Analyzers 71, 73, 75 and 77 are located directly optically in front of photodetectors a1, a3, a5 and a7, respectively, with the angle of the analyzing axes thereof with respect to the polarized plane of the incident light being $\phi A$. Likewise, analyzers 72, 74, 76 and 78 are located directly optically in front of photodetectors a2, a4, a6 and a8, respectively, so that the angle of the analyzing axes thereof with respect to the polarized plane of the incident light is $\phi B$. The hatching in the analyzers indicates the direction of the analyzing axes of each section. A differential amplifier 79 takes the difference between the sum PA of the outputs from photodetectors a1, a3, a5 and a7 and the sum PB of the outputs from photodetectors a2, a4, a6 and a8, thereby generating the RF signal.

In comparison with Embodiments 1, 2 and 3, Embodiment 4 with its photodetector divided into a larger number of sections minimizes the effect of the roughness of the substrate on signal detection at the higher spatial frequency components. Thus, a signal to noise ratio of the reproduced signal is as high as that obtained by the differential detection method conventionally utilized.

Embodiment 4, with the photodetector divided into eight sections, provides for a significant minimization of recording medium defects on signal detection to an extremely small level. As n increases the insensitivity of the read-out system to dust or other defects on the recording medium increases so that improved performance is obtained.

The magneto-optical read-out systems of Embodiments 1-4 establish the direction of the polarized plane of the incident light coincident with the direction tangential to the track. However, it is not necessary that this geometric relationship be present.

In the magneto-optical signal read-out systems constructed in accordance with the present invention, the greater the number of dividing lines on the photodetector (and the correspondingly larger number of sections on the photodetector), the closer the system approaches the S/N ratio of the conventional differential detection method, which essentially duplicates the entire light beam for different purposes (although at the significant cost of much additional hardware, size, weight and cost). In practice, n may be 1, 2, 3, 4 or more. Preferably, for excellent system performance n is set to 2 or more resulting in 4 or more photodetector sections.

Accordingly, an improved magneto-optical signal read-out system in which in-phase noise such as laser noise is cancelled out to produce a very high signal to noise ratio of the detected signal is provided. In addition, in contrast to the conventional differential method the magneto-optical head constructed in accordance with the invention is small, light and can be produced at a very low cost. The reduction in size and weight of the optical head also significantly decreases the access time which increases the speed of the magneto-optical player. The reduction in size and weight of the optical head also permits the magneto-optical player to be made smaller and lighter. The optical head is a large portion of the optical player's total production cost and the significant reduction in cost created by the disclosed magneto-optical signal read-out system has a significant impact on reducing the overall cost of the magneto-optical player.

In addition, the division of the photodetectors minimizes the noise resulting from recording medium defects and roughness on the substrate surface. The reduction in the effect of defects in the recording medium allows the recording medium to contain a greater number of defects without negatively effecting signal detection. This in turn allows a reduction in the cost of the magneto-optical recording medium.

The present invention may be modified in many ways and the various embodiments shown are merely by way of example. For example, the recording medium may be a card type recording medium or other configurations instead of the disk described above. Further, the photodetector may be divided at other angles than those shown in the above embodiment and may be adjusted in accordance with the properties of the recording medium used. Further, the invention may also be applied to deflecting type magneto-optical heads in which the beam is scanned on the recording medium which does not move.

It will thus be seen that the objects set forth above, among those made apparent from the preceding descriptions, are efficiently attained and, since certain changes may be made in the above constructions without departing from the spirit and scope of the invention, it is intended that all matter contained in the above descriptions or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magneto-optical signal read-out system for a magneto-optical player in which the polarized plane of linearly polarized incident light is rotated when the incident light is reflected by or passes through a magneto-optical medium having tracks thereon and the rotation angle of said polarized plane is utilized as an information signal, said read-out system comprising:

first analyzer means positioned to filter a first portion of the incident light and pass through a first analyzed incident light, wherein the angle between the analyzing axis of said first analyzer means and the polarized plane of the linearly polarized incident light is $\phi A$;

second analyzer means positioned to filter a second portion of the incident light and pass through a second analyzed incident light, wherein the angle between the analyzing axis of said second analyzer means and the polarized plane of the linearly polarized incident light is $\phi B$;

a photo detector means divided into first and second photodetector section means by a dividing line substantially perpendicular to a tangent line of the track direction on the recording medium, the first photodetector section means being positioned to detect the first analyzed incident light and output a first output signal representative of the intensity of the first analyzed incident light, the second photodetector section means being positioned to detect the second analyzed incident light and output a second output signal representative of the intensity of the second analyzed incident light; and differential amplifier means for receiving said first output signal and said second output signal and in response thereto producing a detected signal representative of the difference between the first and second output signals, whereby in-phase noise in the detected signal is reduced.

2. The magneto-optical signal read-out system of claim 1 wherein the photodetector means is divided into 2n photodector sections by n straight dividing lines in a plane (where n is a positive integer and the 2n photodetector sections are referred to, starting from an arbitrary section and proceeding counterclockwide, as photodetectors a1, a2, a3, . . . a2n and the first photodetector section means includes photodetector sections a1, a3, . .

a2n -1 and the second photodetector section means include photdetectors a2, a4, . . . a2n).

3. The magneto-optical signal read-out system of claim 1 wherein angle $\phi A$ is not equal to angle $\phi B$.

4. The magneto-optical signal read-out system of claim 1 wherein the angle of $\phi A$ and $\phi B$ are defined in the range of $0 < |\phi A|$ and $|\phi B| \leq 45°$.

5. The magneto-optical signal read-out system of claim 1 wherein $\phi A$ equals 45° and $\phi B$ equals $-45°$.

6. The magneto-optical signal read-out system of claim 1 wherein the first and second analyzer means are Polaroid sheet films.

7. The magneto-optical signal read-out system of claim 1 wherein the first portion of the incident light and the second portion of the incident light are each one-half of the incident light.

8. A magneto-optical signal read-out system for a magneto-optical player in which the polarized plane of linearly polarized incident light is rotated when the incident light is reflected by or passes through a magneto-optical medium having tracks thereon and the rotation angle of said polarized plane is utilized as an information signal, said read-out system comprising:

firt analyzer means positioned to filter a first portion of the incident light and pass through a first analyzed incident light, wherein the angle between the analyzing axis of said first analyzer means and the polarized plane of the linearly polarized incident light is $\phi A$;

second analyzer means positioned to filter a second portion of the incident light and pass through a second analyzed incident light, wherein the angle between the analyzing axis of said second analyzer means and the polarized plane of the linearly polarized incident light is $\phi B$;

a photo detector means divided into first and second photodetector section means by a dividing line substantially perpendicular to tangent line of the track direction on the recording medium, the first photodetector section means being postioned to detect the first analyzed incident light and output a first output signal representative of the intensity of the first analyzed incident light, the senod photodetector section means being positioned to detect the second analyzed incident light and output a second output signal representative of the intensity of the second analyzed incident light; and differential amplifier means for receiving said first output signal and said second output signal and in response thereto producing a detected signal representative of the difference between the first and second output signals, whereby in-phase noise in the detected signal is reduced, wherein the first and second photodetector section means and first and second analyzer means are each divided into two sections.

9. A magneto-optical signal read-out system for a magneto-optical player in which the polarized plane of linearly polarized incident light is rotated when the incident light is reflected by or passes through a magneto-optical medium having tracks thereon and the rotation angle of said polarized plane is utilized as an information signal, said read-out system comprising:

first analyzer means positioned to filter a first portion of the incident light and pass through a first analyzed incident light, wherein the angle between the analyzing axis of said first analyzer means and the polarized plane of the linearly polarized incident light is $\phi A$;

second analyzer means positioned to filter a second portion of the incident light and pass through a second analyzed incident light, wherein the angle between the analyzing axis of said second analyzer means and the polarized plane of the linearly polarized incident light is $\phi B$;

a photo detector means divided into first and second photodetector section means by a dividing line substantially perpendicular to tangent line of the track direction on the recording medium, the first photodetector section means being positioned to detect the first analyzed incident light and output a first output signal representative of the intensity of the first analyzed incident light, the second photodetector section means being positioned to detect the second analyzed incident light and output a second output signal representative of the intensity of the second analyzed incident light; and differential amplifier means for receiving said first output signal and said second output signal and in response thereto producing a detected signal representative of the difference between the first and second output signals, whereby in-phase noise in the detected signal is reduced, wherein the first and second photodetector section means and first and second analyzer means are each divided into four sections so that the incident light appears divided into eight portions.

10. The magneto-optical signal read-out system of claim 9 further including first summing means for summing the outputs of the four first photodetector sections to produce the first output signal and second summing means for summing the outputs of the four second photodetector section outputs to produce the second output signal.

11. The magneto-optical signal read-out system of claim 2 wherein angle $\phi A$ is not equal to angle $\phi B$.

12. The magneto-optical signal read-out system of claim 2 wherein the angle of $\phi A$ and $\phi B$ are defined in the range of $0 < |\phi A| =$ and $|\phi B| \leq 45°$.

13. The magneto-optical signal read-out system of claim 2 wherein $\phi A$ equals 45° and $\phi B$ equals $-45°$.

14. The magneto-optical signal read-out system of claim 2 wherein the first and second analyzer means are Polaroid sheet films.

15. The magneto-optical signal read-out system of claim 2 wherein $n=1$, there are two photodetector sections and the one straight dividing line is substantially perpendicular to a tangent line to the track direction on the recording medium.

16. The magneto-optical signal read-out system of claim 2 wherein $n=2$ and the photodetector means is divided into four photodetector sections by two straight dividing lines, one of the lines being substantially perpendicular to the direction of a tangent line to the track direction on the recording medium and the other is substantially parallel to a tangent line to the track direction on the recording medium.

17. The magneto-optical signal read-out system of claim 2 wherein $n=4$ and the photodetector means is divided into eight photodetector sections by four straight dividing lines.

18. The magneto-optical signal read-out system of claim 17 wherein the four dividing lines divide the photodetector means into eiggh equal photodetector sections.

19. The magneto-optical signal read-out system of claim 18 wherein four of the photodetector sections correspond to the first photodetector section means and the other four photodetector sections correspond to the second photodetector section means.

* * * * *